(12) United States Patent
Hollesen et al.

(10) Patent No.: US 6,640,587 B1
(45) Date of Patent: Nov. 4, 2003

(54) LUBRICATED GLASS MOLD

(75) Inventors: David B. Hollesen, Belle Mead, NJ (US); Peter M. Mueller, Suwanee, GA (US); Gerald P. Nunnally, Cornelia, GA (US); Ivan Pawlenko, Holland, PA (US); Larry Samson, Langhorne, PA (US)

(73) Assignee: Lucent Technologies Inc., Murray Hill, NJ (US)

( * ) Notice: Subject to any disclaimer, the term of this patent is extended or adjusted under 35 U.S.C. 154(b) by 380 days.

(21) Appl. No.: 09/677,133

(22) Filed: Sep. 29, 2000

(51) Int. Cl.⁷ .................. C03B 40/04; C03B 23/045
(52) U.S. Cl. ............... 65/169; 65/295; 65/296; 65/297; 72/69; 425/392; 425/402
(58) Field of Search .................. 65/24, 25.1, 108, 65/169, 170, 295, 296, 297, 298; 425/392, 402; 72/69

(56) References Cited

U.S. PATENT DOCUMENTS

| | | | |
|---|---|---|---|
| 958,613 A | * 5/1910 | Forgo | 65/25.3 |
| 3,186,818 A | * 6/1965 | Havens et al. | 65/169 |
| 3,254,981 A | * 6/1966 | Havens | 65/359 |
| 3,298,808 A | * 1/1967 | Macks | 65/25.1 |
| 3,480,422 A | * 11/1969 | Lichok et al. | 65/169 |
| 3,849,052 A | * 11/1974 | Gordon | 425/387.1 |
| 4,312,659 A | * 1/1982 | Panarello et al. | 65/84 |
| 4,525,136 A | * 6/1985 | Rowley | 425/384 |
| 4,565,082 A | * 1/1986 | Heath et al. | 72/45 |
| 5,683,482 A | * 11/1997 | Fredholm | 65/25.1 |
| 6,457,965 B1 | * 10/2002 | Hegler | 425/233 |

\* cited by examiner

Primary Examiner—Sean Vincent

(57) ABSTRACT

A mold for shaping end portions of glass tubes has first and second mating members which define a contoured bore into which the heated tube fits. Each member has a longitudinal bore from which extend radial bores opening into the interior cavity of the mold containing the tube. Each member also has radial vent bores for venting gases and vapor to the outside. Each longitudinal bore is connected to a lubricant, such as water, supply, which is applied to the surface of the tube through the radial bores.

11 Claims, 3 Drawing Sheets

LUBRICATED GLASS MOLD

FIELD OF THE INVENTION

This invention relates to shaping glass tubes for use in the production of optical fibers and, more particularly to the shaping of the end of a glass tube by means of lubricated molds.

BACKGROUND OF THE INVENTION

In the manufacture of optical fibers, a process known as MCVD (modified chemical vapor deposition), which is shown and described in U.S. Pat. No. 4,217,227 of J. B. MacChesney et al is widely used. An initial step of the process involves injecting into a glass tube, commonly referred to as a starter tube, a gaseous mixture containing certain reactants while the tube is being heated by a moving torch. The particle components of the gaseous mixture, referred to as "soot" are deposited on the interior wall of the tube in the region thereof of greatest heat. After sufficient soot is deposited, the starter tube is heated and collapsed into a glass rod from which optical fiber is subsequently drawn. During the deposition process, the remanant gases and reactants after deposition exhaust out of the end of the tube remote from the introduction end. It is not uncommon for a buildup of soot to occur at the exhaust end of the tube to the point where free flow of the mixture out of the tube is inhibited, which can affect the deposition process. As a consequence, it is the usual practice to butt fuse an exhaust tube to the exhaust end of the starter tube, the exhaust tube having a larger internal diameter to permit free flow of the exhaust gas mixture from the starter tube into and through the exhaust tube. However, if the fusion joint inside the tubes is not smooth or otherwise represents a discontinuity, there can still occur a building up of the soot at the joint which can cause clogging. It is equally as important as a smooth junction that the two tubes be precisely aligned so that they can be rotated as a unit without wobble.

It is common practice to shape the butting end of the exhaust tube by tapering its outside diameter to the diameter of the starter tube. This is usually accomplished through the use of manually manipulated graphite forming tools, such as paddles. The process requires a high level of skill on the part of the operator to the point that it deserves to be characterized as an "art". Manual manipulation seldom results in any thing approximating exact duplication, hence each formed exhaust tube is, in essence, custom made. Tubes formed manually in this manner have little uniformity and dimensional commonality and, as a result, a high scrap rate of exhaust tubes is usually the case. A further common problem is that precise symmetry of the formed diameter relative to the centerline of the starter tube is quite difficult to achieve. As pointed out hereinbefore, precise alignment of the starter tube and the exhaust tube is a desideratum which is negated by any eccentricity of the exhaust tube resulting from the manual shaping process.

Some prior art methods are directed toward eliminating the use of manually manipulated paddles, by substituting therefor a mold, of graphite or other suitable material, which shapes the end of the exhaust tube, heated to ductility, while air or other fluid is applied to the interior wall surface to force the tube against the mold and to maintain the tube shape. The process requires a substantial air pressure, which tends to cool the tube to the point where the ductility thereof is insufficient for forming or shaping. In U.S. patent application Ser. No. 09/623,908; filed Jul. 31, 2000 of Jason Kay et al., the disclosure of which is incorporated herein by reference, there is shown an apparatus and method of accurately shaping the inner surface of the end portion of the exhaust tube which does not require pressurized air. The apparatus of that application includes an interior mold that has a variable configuration to allow insertion within and withdrawal from the exhaust tube.

There remain, despite the apparatus of the aforementioned Kay application, problems arising from the physical contact between the outer mold and the exhaust tube. Because the exhaust tube is rotating relative to the mold during the forming process, there is a great deal of wear of the mold which requires frequent replacement to maintain the necessary precision in the finished product. Further, the physical contact produces a distorted glass surface and, over time, undesirable irregularities therein.

SUMMARY OF THE INVENTION

The present invention is an apparatus which substantially reduces the wear of the mold and the resulting surface aberrations of the exhaust tube.

In greater detail, in a first preferred embodiment of the invention, the exterior mold for shaping the end of the rotating exhaust tube comprises first and second substantially identical members having contoured inner surfaces, and a plug for insertion into the end of the exhaust tube to maintain its internal diameter at the desired dimension and axially precise. In accordance with the present invention, each mold member has an elongated bore, preferably parallel to the axis of the assembled mold, extending from one end face thereof along substantially the entire length, but which is closed at the end of the member remote from the end face. Extending from the elongated bore, and in communication therewith, are at least two radial or transverse bores or channels which open at the interior surface of the member. Also extending from the interior surface and open thereto are one or more exhaust or vent bores offset from the radial bores and the elongated bore which connect the inner surface of the member to the exterior surface thereof. The vent bores do not intersect the elongated bore or the channels. Each of the mold members is mounted to a positioning arm for moving the member toward the central axis to form the mold and moving it away from the central axis to access the exhaust tube.

Further in accordance with the invention, the end face of each member has a suitable connection thereon for connecting the elongated bore to a fluid conduit which is, in turn, connected to a fluid (preferably water) supply for applying fluid to the elongated bore and channels. A delivery control means such as a valve member in each conduit can be used to regulate the flow rate of the water supplied to the elongated bore. In operation, the exhaust tube is mounted in, for example, a lathe chuck, and is rotated thereby. Suitable means, such as a torch, is used to heat the end of the exhaust tube to be formed to a ductile state and the mold members are moved into the mold position, embracing the end of the exhaust tube, and the mold plug is moved into place within the end of the exhaust tube. Water is applied through the conduits to the elongated bores, and through the channels to the surface of the rotating exhaust tube, thereby lubricating the mold-glass interface. The application in this manner of a water lubricant materially reduces the long term wear of the contoured inner surface of the mold members and also results in higher surface quality of the exhaust tube end.

The water or other lubricant will, when it contacts the hot glass, vaporize and the water vapor thus created will escape through the vent bores to the outside. The steady flow of water gives continuous lubrication by continuously replacing the vaporized water. The rate of such replacement is governed by the settings of the valves in the conduits, which can be accomplished manually or automatically. As the shaping step is completed, the water supply may be turned off.

From the foregoing, it can be seen that the use of a lubricant in the molding process is readily accomplished with the apparatus of the present invention, the various features and principles of which will be more readily apparent from the following detailed description, read in conjunction with the accompanying drawings.

DETAILED DESCRIPTION

Figure 1:
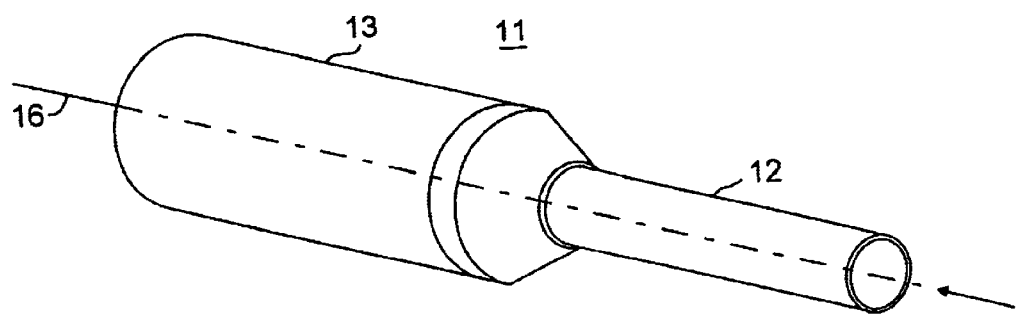
FIG. 1 is a perspective view of a combined starter tube and exhaust tube for the formation of which the present invention is used.
Figure 1A:
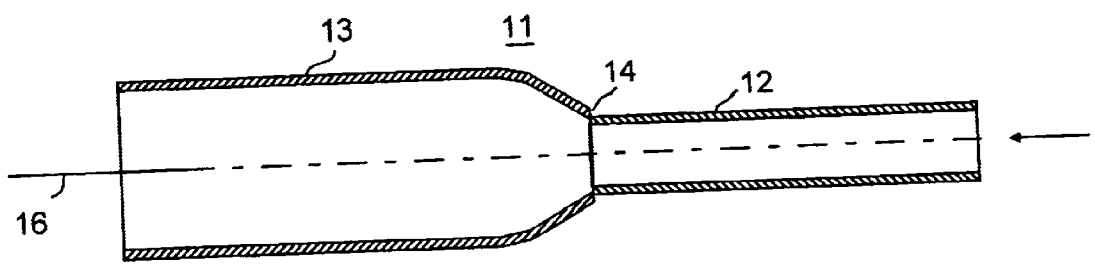
FIG. 1a is a cross-sectional view of the combined tubes of FIG. 1.

FIG. 1 is a perspective view of a glass preform tube 11 which is treated, as discussed hereinbefore, with injection in the direction of the arrow of a gaseous mixture containing reactants, i.e., soot, for deposition on the inner walls. Preform tube 11 comprises a glass starter tube 12 and a glass exhaust tube 13 which are fused together at their ends, as shown. FIG. 1a, which is a cross-sectional elevation view of the preform tube 11 shows more clearly the relationship of tubes 12 and 13, which are butt-fused at the junction 14 of their ends. During the deposition process, the tube 11 is rotated on the central axis 16 which is common to both tubes 12 and 13. Tube 13 is, as discussed hereinbefore, of larger internal diameter than tube 12, so that the remanant gas-reactant mixture exiting tube 12 is not impeded in any way, such as by deposition build-up on the interior wall of tube 13, thereby assuring a uniform deposition in tube 12. It is also desirable that the transition at the fusion region 14 be smooth so as not to disrupt or impede the gaseous flow thereacross. A reduction in turbulence or the prevention thereof helps insure that the layers of soot deposited on the inner wall of the tube 12 have a uniform build-up. Uniformity of deposition is also aided by the centerline or central axis 16, which is composed of the centerlines of the tubes 12 and 13, being straight, i.e., the centerlines being collinear and coextensive. Both of these desiderata are achieved with the present invention, as will be apparent hereinafter.

Figure 2:
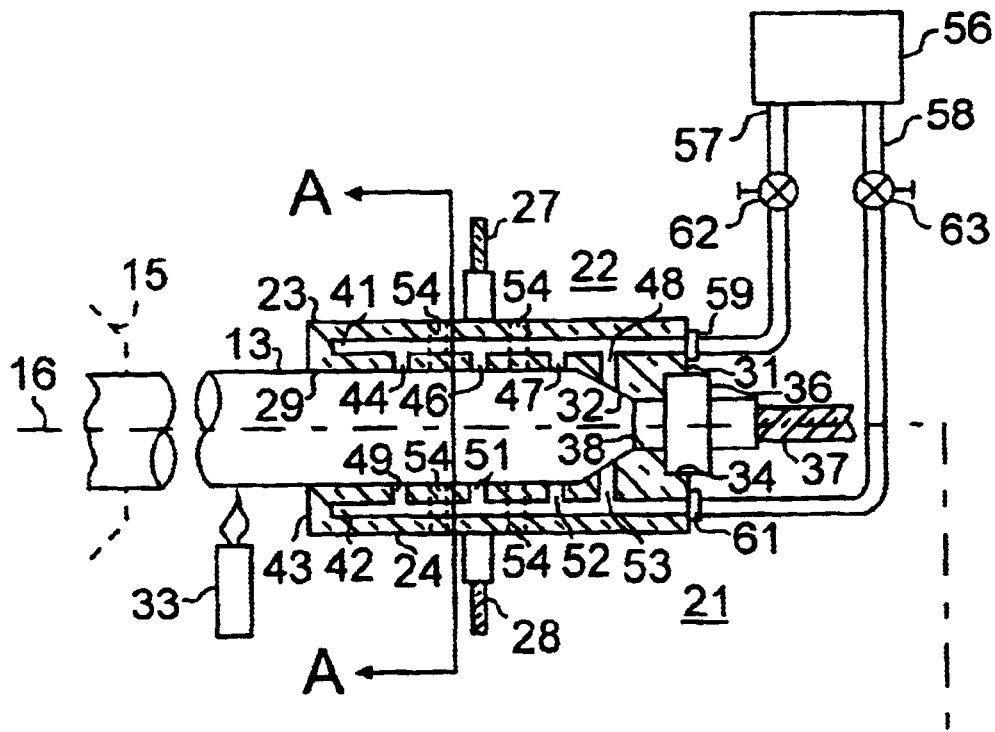
FIG. 2 is a partially diagrammatic, partial cross-sectional elevation view of the apparatus of the present invention.
Figure 3:
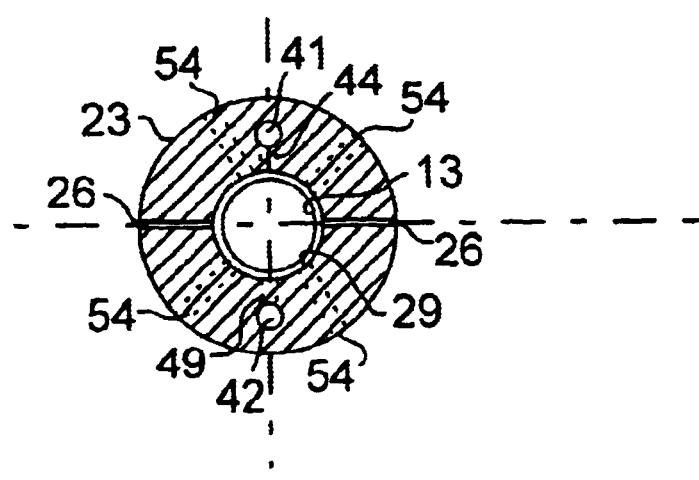
FIG. 3 is a cross-sectional view along the line A—A of a portion of the mold FIG. 2.

FIG. 2 is a diagrammatic view in partial cross-section of the principal components of an apparatus assembly 21 for forming the end of an exhaust tube 13 being held and rotated by, for example, a chuck 15, and which embodies the principles of the present invention. FIG. 3 is a cross-sectional view taken along the line A—A of the apparatus assembly 21 of FIG. 2. Apparatus 21 comprises an external mold 22 of suitable material, such as carbon, graphite, or the like and which comprises two movable mold members 23 and 24. As shown in FIG. 3, mold members 23 and 24, when in the mold position, have surfaces that butt against each other, at 26, thereby forming a complete mold. Each of the mold members 23, 24 is mounted on a positioning arm 27 or 28 which may be threaded or may be the shaft of a piston, for example, for moving each member 23, 24 toward or away from the mold position.

When in the mold position, as shown in FIGS. 2 and 3, mold 22 has a central bore 29 adapted to receive the rotating exhaust tube 13. As can be seen in FIG. 2, bore 29, at the end 31 thereof has a rounded (or tapered) portion 32 for producing a smooth reduction of the diameter of the end of tube 23 when it has been heated to a ductile state by suitable means, such as a torch 33. It is to be understood that torch 33 is intended to be indicative of any of a number of heating elements available in the art. The end 31 of mold 22 extends beyond the end of tube 13 and has a stepped recess 34 for receiving a movable plug 36 mounted on a positioning arm 37. Plug 36 has a reduced diameter portion 38 which fits into a reduced diameter portion of recess 34 and, in the mold position, extends into the interior of mold 22, as shown. Portion 38 has a diameter substantially equal to the diameter of starter tube 12, and functions to limit the molded end of tube 13 to that diameter. Thus, when molding is completed, the end of tube 13 is of the proper size for butt fusing to the end of starter tube 13. Axial travel of plug 36 is limited by the shoulder formed by portion 38 butting against a shoulder in stepped recess 34, as shown.

In accordance with the present invention, each member 23, 24 has a longitudinal bore 41, 42, respectively, extending from end 31 rearwardly to a point adjacent, but not through, the end 43 of mold 22. Bores 41 and 42 are preferably, but not necessarily, parallel to central axis 16. Extending from bore 41 are a plurality of transversely oriented radial bores 44, 46, 47, and 48 extending to the wall of bore 29 and opening therein. In like manner, bores 49, 51, 52, and 53 connect bore 42 to the interior of bore 29. It is to be understood that more or fewer radial bores may be used, as well as more than two longitudinal bores. Extending from the outer surface of each of members 23 and 24 to the interior of bore 29 are a plurality of vent holes 54, which do not intersect either bore 41 or 42, or any of the transverse bores.

A lubricating fluid, e.g., water, supply tank 56 is connected, by means of conduits 57 and 58 and suitable coupling members 59 and 61 to bores 41 and 42, for supplying the water lubricant to the bores 41 and 42 and, through transverse or radial bores 44, 46, 47, 48, 49, 51, 52, and 53 to the surface of tube 13 which, in operation, is mounted in and rotated by a suitable fixture such as a lathe chuck, not shown. Each of conduits 57 and 58 has a control valve, 62 and 63, respectively, for control of the amount of water or other lubricant supplied to mold 22. Valves 62 and 63 may be manually operated, or may be under control of a suitable automatic control arrangement, not shown. Also not shown is a means for pumping the water, if necessary, to insure that there is a uniform delivery of lubricant to the surface of tube 13.

In operation, tube 13 which is being rotated by chuck 15 about the central axis or centerline 16 is heated to ductility and positioned as shown in FIG. 2 and the mold members 23 and 24 are closed thereabout by means of arms 27 and 28. At the same time, plug member 36 is moved into the position shown to limit the diameter of the end of molded tube 13 as explained hereinbefore. The lubricant is supplied to the mold while the end of tube 13 is being shaped, and the vaporized lubricant or water is vented to the outside through vents 54. The heating element 33 is preferably able to maintain the heat of the tube end sufficient to maintain ductility until the molding process is completed after which the lubricant fluid can have a cooling effect on the end of tube 13. The plug 36 insures that the axis of the shaped end of tube 13, i.e., the diameter, is collinear with the tube axis so that it will, in turn, be collinear with the starter tube 12 when they are fused together. During the molding process, the tube 13 can be heated to a point where it is so ductile that it tends to collapse during the molding process, depending, at least in some cases, on the material of the tube. This collapse can be prevented by injecting pressurized air into the tube while it is being molded. Also, plug 36 restrains the end of the tube from collapsing. In the aforementioned U.S. patent application of Jason Kay et al., there is shown an arrangement for preventing collapse of the tube without the need for pressurized air.

Figure 4:
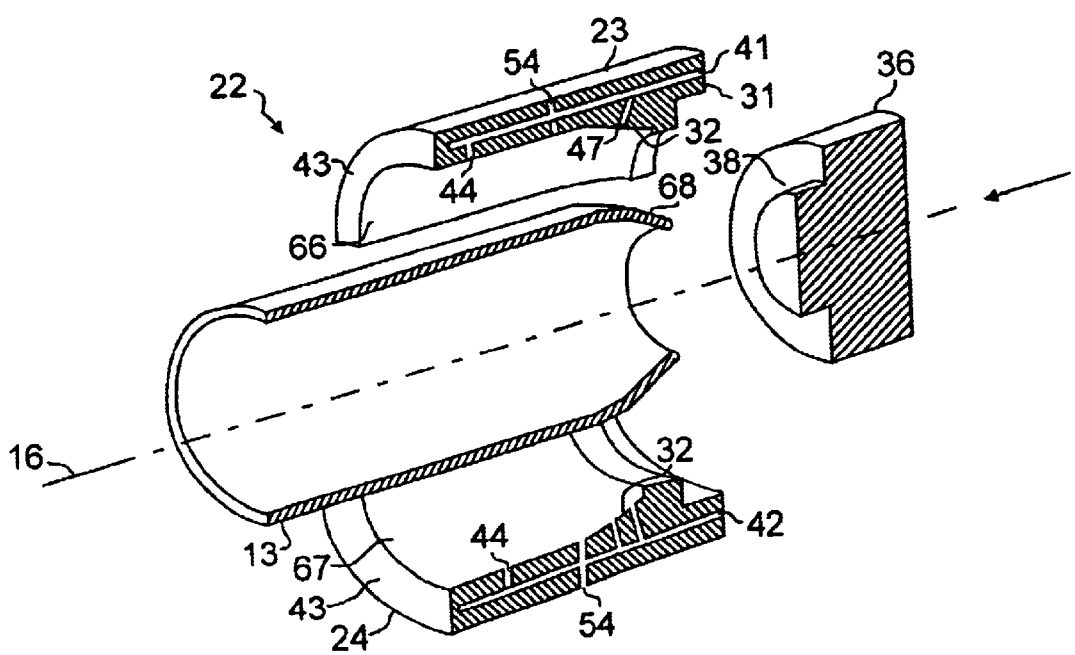
FIG. 4 is an exploded perspective view, in cross-section, of the mold of the present invention.
Figure 5:
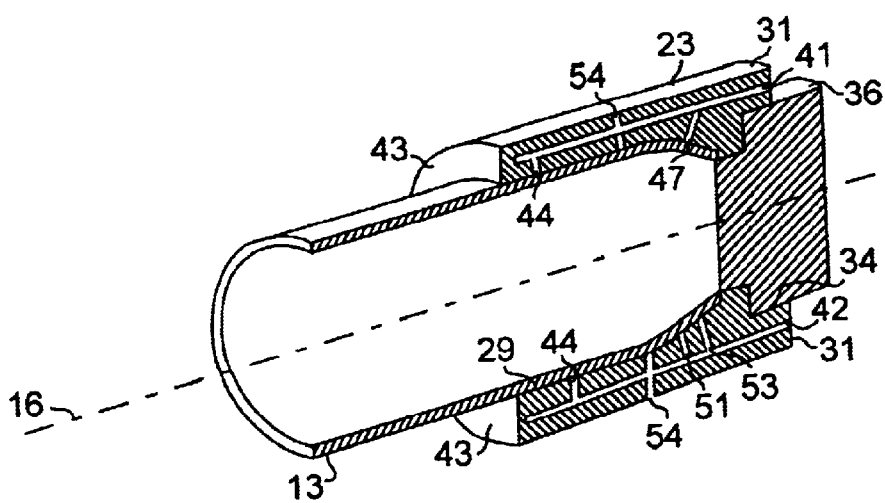
FIG. 5 shows the mold of FIG. 4 in its operational configuration.

FIG. 4 is a perspective exploded view, in cross-section of the mold 22 of the invention and FIG. 5 depicts the mold 22 of FIG. 4 in its operative configuration. As discussed hereinbefore, mold 22 comprises two members 23 and 24 of suitable material such as graphite or carbon or other material commonly used in glass molding, such as ceramic material. Member 23 is semi-circular in shape and has an arcuate inner surface 66 and member 24 has an arcuate inner surface 67. When the two halves 23 and 24 are brought together to form mold 22, surfaces 66 and 67 form bore 29 which receives tube 13, as shown in FIG. 5. Surfaces 66 and 67 have, adjacent end 31 of mold 22, tapers 32 for imparting to tube 13 a tapered end 68, as best seen in FIG. 4. In accordance with one aspect of the invention, member 23 has a longitudinal bore 41 therein which ends just short of end 43 thereof from which extend transverse (or radial) bores 44 and 47 which connect bore 41 to the interior of bore 29 through surface 66. Although only two such radial bores 44 and 47 are shown, a greater number of such bores may be formed in member 23, depending upon such factors as the material of tube 13, the heat required to impart ductility thereto, and the type and amount of lubricant to be used. Extending from surface 66 to the external surface of member 23, thereby connecting the interior of bore 29, to the outside, are one or more radial vent holes 54 which do not intersect any of the bores 41, 44, and 47. In like manner, member 24 has a longitudinal bore 42, radial bores 49, 51, and 53, and one or more vent holes 54.

The front 31 of mold 22 has, when members 23 and 24 are in operative position as shown in FIG. 5, a stepped recess 34 having a reduced diameter portion which receives the reduced diameter portion 38 of plug 36 as discussed hereinbefore. The shoulder 71 formed by the step in recess 34 serves to locate plug 36 longitudinally relative to the end of tube 13 by engaging the large diameter portion of plug 36, as shown in FIG. 5.

It is to be understood that the various features of the present invention are susceptible to inclusion in any of a number of possible embodiments, and that various modifications or adaptations might occur to workers in the art. All such embodiments, variations, or adaptations are intended to be included herein as being within the scope of the present invention as set forth. Further, in the claims hereinafter, the corresponding structures, materials, acts, and equivalents of all means or step plus function elements are intended to include any structure, material, or acts for performing the functions in combination with other elements as specifically claimed.

What is claimed is:

1. An apparatus for shaping an end of an elongated tubular member having an axially extending bore having a first inside diameter which is rotatable about a central axis wherein the tube has been heated to a ductile state, said apparatus comprising:

a mold for shaping the rotating tube at the end to be shaped into a reduced diameter portion having an opening therein, said mold having first and second mold members defining a contoured bore surrounding the tube, each of said mold members comprising a body having a longitudinal bore therein extending from a first end of said body toward a second end;

one or more radial bores extending from said longitudinal bore and opening into said contoured bore;

a lubricant carrying conduit connected to each of said longitudinal bores for supplying lubricant thereto, said conduit being connected to a lubricant source;

said first and second mold members further defining a recess at an end thereof adjacent the region therein where the tube end is to be shaped, said recess being axially aligned with the central axis; and a plug for defining the inside diameter concentric opening of the shaped tube end, said plug being insertable in said recess and extending into the contoured bore for precisely axially aligning the reduced diameter opening of the tubular member with the central axis.

2. An apparatus as claimed in claim 1 wherein the lubricant is water.

3. An apparatus as claimed in claim 1 wherein each said lubricant carrying conduit has a delivery control means therein for regulating the flow of lubricant to said longitudinal bore.

4. An apparatus as claimed in claim 1 wherein each of said mold member has one or more vent bores extending from said contoured bore to the external surface of the mold member in which they are located, each of said vent bores being offset from said radial bores and from said longitudinal bore.

5. An apparatus as claimed in claim 1 and further comprising at least one positioning member attached to one of said mold members for moving said member toward and away from the central axis.

6. An apparatus as claimed in claim 5 wherein each of said mold members has a positioning arm attached thereto for moving said members into a position where they form a mold.

7. An apparatus as claimed in claim 6 wherein said plug member has a positioning arm attached thereto for moving said plug along the central axis to form a completed mold in conjunction with said mold members.

8. For use in an apparatus for shaping an end of a tubular member, a mold comprising:

first and second mold forming members having front and rear ends and adapted to be mated to form the mold having a central axis;

each of said mold forming members having an elongated arcuate contoured inner surface for forming a central bore extending along the central axis of said mold, said central bore being contoured at one end thereof for forming a reduced diameter end of the tubular member;

each of said mold forming members having an elongated bore extending from one of said ends toward the other end;

one or more radial bores therein extending from said elongated bore and opening is said central bore; and one end of said mold at the contoured end having a recess therein when said mold forming members are mated communicating with said central bores and axially aligned therewith, sand a plug member adapted to fit within said recess and extend into said central bore in axial alignment therewith.

9. A mold as claimed in claim 8 and further including at least one vent bore in each of said mold forming members for connecting said central bore to the exterior of said mold.

10. A mold as claimed in claim 9 wherein each said vent bore is offset from said radial bores and said longitudinal bore.

11. A mold as claimed in claim 8 wherein the elongated bore in each of said mold forming members has a connector attached thereto for introducing lubricating fluid from a source into said elongated bore.

* * * * *